(12) United States Patent
Ossipov et al.

(10) Patent No.: US 11,711,342 B2
(45) Date of Patent: Jul. 25, 2023

(54) ENDPOINT-ASSISTED ACCESS CONTROL FOR NETWORK SECURITY DEVICES

(71) Applicant: Cisco Technology, Inc., San Jose, CA (US)

(72) Inventors: Andrew E. Ossipov, Lewisville, TX (US); Aaron Troy Woland, Waxhaw, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 181 days.

(21) Appl. No.: 16/746,170

(22) Filed: Jan. 17, 2020

(65) Prior Publication Data
US 2021/0226918 A1 Jul. 22, 2021

(51) Int. Cl.
*H04L 1/00* (2006.01)
*H04L 9/40* (2022.01)
*H04L 61/58* (2022.01)
*H04L 61/4511* (2022.01)

(52) U.S. Cl.
CPC ...... *H04L 63/0236* (2013.01); *H04L 61/4511* (2022.05); *H04L 61/58* (2022.05); *H04L 63/20* (2013.01)

(58) Field of Classification Search
CPC . H04L 63/0236; H04L 61/6009; H04L 63/20; H04L 61/1511; H04L 61/2007; H04L 61/10
USPC .......................................................... 726/3
See application file for complete search history.

(56) References Cited

U.S. PATENT DOCUMENTS

| 8,621,556 | B1 | 12/2013 | Bharali et al. |
| 8,811,228 | B2 | 8/2014 | Lopez et al. |
| 8,955,105 | B2 | 2/2015 | Hudis et al. |
| 9,894,041 | B2 * | 2/2018 | Norum ............... H04L 63/0428 |
| 2004/0047349 | A1 * | 3/2004 | Fujita ................. H04L 61/1511 |
| | | | 370/389 |

(Continued)

FOREIGN PATENT DOCUMENTS

WO 2019102077 A1 5/2019

OTHER PUBLICATIONS

J. Arkko et al., "IPv4 Address Blocks Reserved for Documentation", Internet Engineering Task Force (IETF), Request for Comments: 5737, Updates: 1166, Category: Informational, ISSN: 2070-1721, Jan. 2010, 5 pages.

*Primary Examiner* — Anh Nguyen
*Assistant Examiner* — Tesfu N Mekonen
(74) *Attorney, Agent, or Firm* — Edell, Shapiro & Finnan, LLC

(57) ABSTRACT

A network security device has at least one Fully Qualified Domain Name (FQDN) access policy that permits traffic to flow to at least one resource associated with at least one FQDN. The network security device receives, from a managed endpoint device, a packet directed to the at least one resource associated with the at least one FQDN. The network security device obtains DNS information associated with the managed endpoint device and, based on the domain name system (DNS) information, substitutes a network address of the at least one resource into the at least one FQDN access policy to open a traffic flow to the at least one resource associated with the at least one FQDN. The network security device then provides the packet to the at least one resource associated with the at least one FQDN.

20 Claims, 4 Drawing Sheets

(56) References Cited

U.S. PATENT DOCUMENTS

| | | | |
|---|---|---|---|
| 2011/0078326 A1* | 3/2011 | Horibuchi | H04L 29/12377 709/232 |
| 2012/0124239 A1* | 5/2012 | Shribman | H04L 61/1552 709/245 |
| 2013/0179551 A1* | 7/2013 | Li | H04L 61/1511 709/223 |
| 2013/0254423 A1* | 9/2013 | George, IV | H04L 61/1511 709/238 |
| 2014/0304412 A1* | 10/2014 | Prakash | H04L 69/40 709/226 |
| 2015/0288711 A1 | 10/2015 | Jorgensen | |
| 2015/0358285 A1* | 12/2015 | Ellard | H04L 41/00 726/12 |
| 2017/0222978 A1* | 8/2017 | Cathrow | H04L 63/0236 |
| 2019/0012322 A1* | 1/2019 | Contreras | G06F 16/951 |
| 2019/0036871 A1* | 1/2019 | Lapidous | H04L 63/0281 |
| 2019/0327205 A1* | 10/2019 | Saidumuhamed | H04L 61/1552 |
| 2020/0228486 A1* | 7/2020 | Park | H04L 61/4511 |
| 2020/0396207 A1* | 12/2020 | Motwani | G06F 11/3476 |

* cited by examiner

ENDPOINT-ASSISTED ACCESS CONTROL FOR NETWORK SECURITY DEVICES

TECHNICAL FIELD

The present disclosure relates to network security devices.

BACKGROUND

Network security devices are generally configured to monitor incoming and outgoing traffic (packets) and to apply security rules to the traffic. For example, network security devices may be configured to implement security rules/policies that determine whether it is appropriate to open a communication port to permit outgoing traffic to reach a specific destination. Such security policies may be based on Internet Protocol (IP) addresses of the source and destination devices. However, more recently, there has been an increasing need to base these security rules on Fully Qualified Domain Name (FQDN) attributes, instead of IP addresses. Enforcing these security rules is challenging because it requires obtaining domain name system (DNS) information in order to resolve FQDN attributes to specific IP addresses.

DESCRIPTION OF EXAMPLE EMBODIMENTS

Overview

Figure 1:
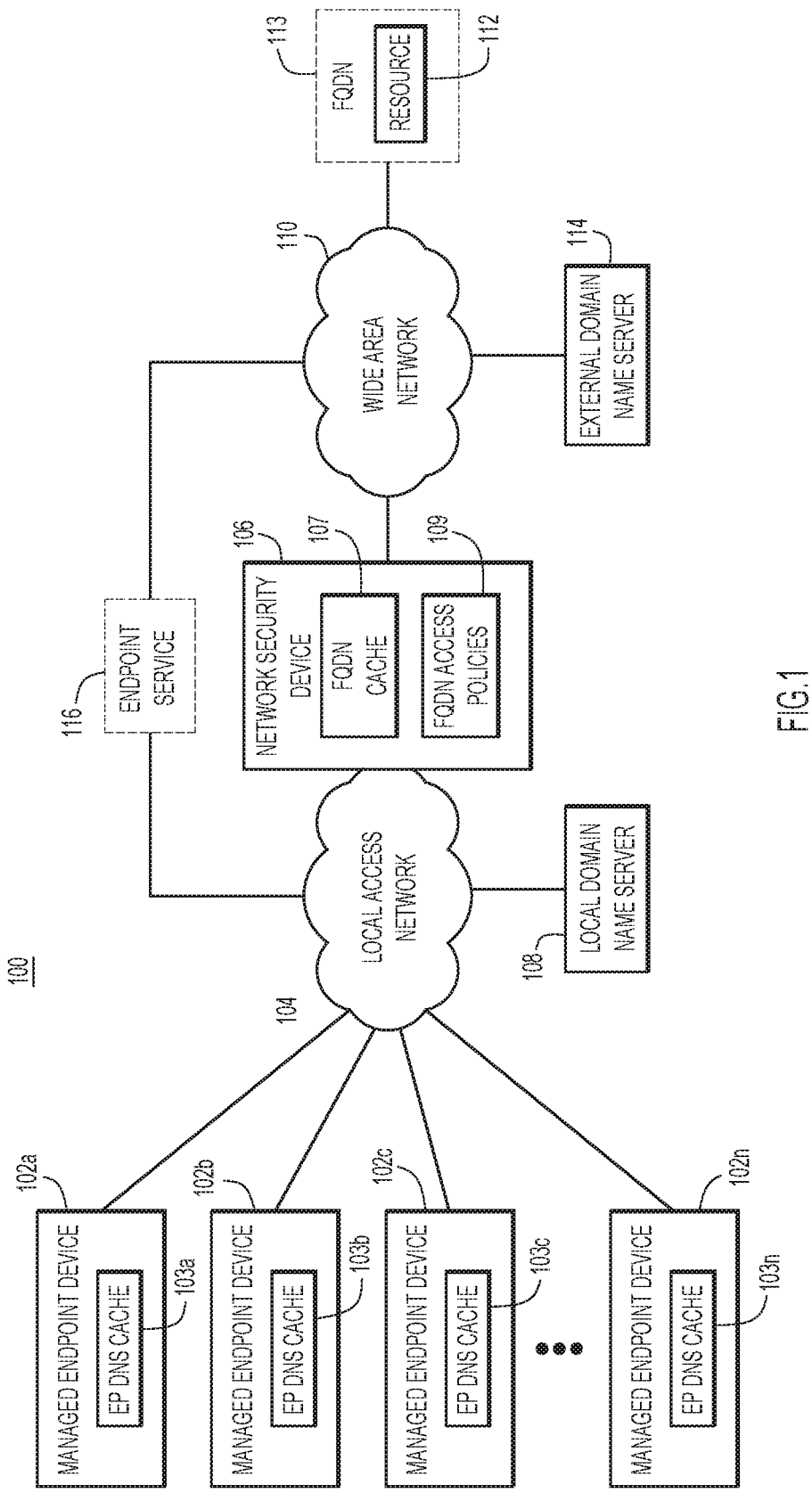
FIG. 1 is a block diagram illustrating an environment in which a network security device obtains DNS information associated with a managed endpoint device to permit traffic to flow to resources associated with at least one FQDN, according to an example embodiment.

Presented herein are techniques for obtaining domain name system (DNS) information associated with managed endpoint devices and using the DNS information to open a port to resources associated with at least one Fully Qualified Domain Name (FQDN). A network security device has at least one FQDN access policy that permits traffic to flow to at least one resource associated with at least one FQDN. The network security device receives, from a managed endpoint device, a packet directed to the at least one resource associated with the at least one FQDN, wherein the packet includes at least a network address of the at least one resource. The network security device obtains DNS information associated with the managed endpoint device and, based on the DNS information, substitutes the network address of the at least one resource into the at least one FQDN access policy to open a traffic flow to the at least one resource associated with the at least one FQDN. The network security device then provides the packet to the at least one resource associated with the at least one FQDN.

EXAMPLE EMBODIMENTS

The DNS is a name resolution system used to resolve host names to one or more Internet Protocol (IP) addresses. Since a DNS resolution session and an actual application access attempt are inherently separated, the mapping there between may be inaccurate or not always possible. For example, a network security device may attempt to inspect DNS traffic or resolve a configured FQDN access policy through a local DNS lookup. However, an endpoint device such as a server that generated the traffic may resolve the DNS out of band and/or differently from the network security device (e.g., due to the proliferation of content delivery networks). As such, the network security device may resolve the FQDN differently from the endpoint device or may not be able to resolve the FQDN at all.

In some deployments, even when the DNS lookup is provided in band via the network security device, the DNS lookup may not be accessible to the network security device. For example, the DNS queries from an endpoint device to the DNS resolver may be encrypted due to privacy concerns. Operating systems are adding support for encrypting the DNS queries using DNS over Transport Layer Security (TLS) protocol, DNS over Hypertext Transfer Protocol Secure (HTTPS), or using DNSCrypt protocol. Since the DNS queries are encrypted, the network security device cannot resolve the FQDN based on these DNS queries.

If the network security device resolves the FQDN differently from the endpoint device, the FQDN access policy may be unenforceable. As a result, enforcing FQDN access rules/polices may be challenging for network security devices configured with access policies that leverage FQDN attributes, instead of IP addresses. Additional challenges are presented by wildcards that may be used in FQDN definitions. Presented herein are techniques that enable network security devices to enforce access policies that leverage FQDN attributes, sometimes referred to herein as FQDN access policies, including FQDN access policies that use wildcards. In particular, the techniques presented herein enable network security devices to obtain DNS information (e.g., FQDN mapping resolutions), directly or indirectly from associated managed endpoint devices.

Reference is now made to FIG. 1, which is a block diagram of an environment 100 in which a network security device obtains DNS information associated with a managed endpoint device to permit traffic to flow to resources associated with at least one FQDN, according to an example embodiment.

The environment 100 includes a plurality of managed endpoint devices (endpoint devices 102a-102n), a local access network (LAN) 104, a network security device 106 at an edge of the LAN 104, and a local domain name server 108. The environment 100 further includes a wide area network (WAN) 110, a resource 112 in an FQDN 113, an external domain name server 114, and an endpoint service 116.

The endpoint devices 102a-102n each include a corresponding endpoint DNS cache 103a-103n (i.e., managed endpoint device 102a includes an endpoint DNS cache 103a, managed endpoint device 102b includes an endpoint DNS cache 103b, managed endpoint device 102c includes an endpoint DNS cache 103c, and managed endpoint device 102n includes an endpoint DNS cache 103n). Each of the endpoint DNS caches 103a-n stores mappings of IP addresses to a corresponding domain names of previously made lookup requests so that a domain name (e.g., a website's Uniform Resource Locator (URL)) can be resolved to a corresponding IP address quickly and efficiently.

That is, a domain name may have a number of IP addresses associated therewith and domain names are mapped to respective IP addresses using domain name resolution services provided by the local domain name server 108 and/or the external domain name server 114. The network security device 106 needs to resolve the IP addresses in the same way as the endpoint devices 102a-102n (i.e., map it to the same domain name) for accurate enforcement of security policies against packets from the endpoint devices 102a-102n. The mappings or address to domain name resolutions are stored in a local DNS cache (one of the endpoint DNS caches 103a-n) of a respective one of the endpoint devices 102a-102n. The endpoint devices 102a-102n are protected/managed endpoint devices that have a software security component installed therein and this component has a pre-established control plane connection that be leveraged by the network security device 106.

The number of endpoint devices shown in FIG. 1 is merely illustrative and the techniques presented herein may be implemented with different numbers of devices, depending, for example, on a particular configuration of the environment 100. The endpoint devices 102a-102n may include, but are not limited to, physical or virtual servers, computers, user equipment devices such as mobile devices, mobile terminals or stations, internet of things (IoT) devices, consumer devices such as a personal digital assistant (PDA) or a smart phone, a personal computer (PC) such as a notebook or a desktop computer.

The endpoint devices 102a-102n may communicate with each other using LAN 104. Some examples of the LAN 104 include, but are not limited to, wired accesses/access types (e.g., Ethernet) and wireless accesses/access types (e.g., over-the-air Radio Frequency (RF) accesses also sometimes referred to as Radio Access Technology (RAT) types such as, but not limited to: non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; cellular accesses such as 3GPP licensed spectrum accesses (e.g., 3rd Generation (3G), 4G/LTE, 5G, New Radio (NR), and/or next Generation (nG) accesses) and/or 3GPP unlicensed spectrum accesses (e.g., Licensed-Assisted Access (LAA), enhanced LAA (eLAA), further enhanced LAA (feLAA), and New Radio Unlicensed (NR-U)); Citizen Broadband Radio Service (CBRS) accesses; combinations thereof; and/or the like. The LAN 104 also connects the endpoint devices 102a-102n to an outside world i.e., the WAN 110.

The WAN 110 is a public data network such as the Internet via which the endpoint devices 102a-102n may obtain contents from a resource 112 or provide contents to the resource 112. The resource 112 is a remote device that stores contents. For example, the resource 112 may be, but is not limited, to a physical or virtual server hosting one or more websites or providing one or more services (applications) to the endpoint devices 102a-102n. The endpoint devices 102a-102n send one or more packets to the resource 112 to request a website or other content from the resource 112 or may provide content to a resource 112. Although only one resource 112 is depicted in FIG. 1, the number of resources is not limited to one and depends on a particular configuration of the environment 100. Further, the type of resource is not limited to a website and may include a computational resource, a remote storage, and so on. While the resource 112 is depicted as an external destination resource in the environment 100, the resource 112 may alternatively be an internal resource. Internal resources may include services, other network devices, and endpoint hosts that are connected to the endpoint devices 102a-102n via the LAN 104. The endpoint devices 102a-102n may communicate with each other, internal resources, and/or external resources using domain names that require a mapping to an actual address or location of the respective resource. The resource 112 is part of the FQDN 113.

As noted, the environment 100 further includes a network security device 106. The network security device 106 may be any network device that applies security rules to incoming and/or outgoing traffic. For example, network security device 106 may be a network firewall implemented on an edge router device. A network firewall may be, but is not limited to, a next generation firewall, a host based firewall such as advance malware protection (AMP), Tetration, an Intrusion Protection System, a Secure Web Gateway (like the Umbrella Secure Internet Gateway (SIG) and the Web Security Appliance (WSA)).

As another example, the network security device 106 may be an access control product where the security rules are applied at network layers and/or control is performed at network layers. The network security device 106 may be, but is not limited to, a wireless access point, a wireless local access network (LAN) controller, and/or a network switch with dynamic access control lists (ACLs).

Returning to the specific example of FIG. 1, the network security device 106 is configured to control the flow of traffic to and from the LAN 104 by applying security rules and access control policies, including one or more policies that leverage FQDN attributes and/or use wildcards in FQDN definitions (FQDN access policies). To this end, the network security device 106 includes a FQDN cache 107 that stores mappings of IP addresses to domain names. The network security device 106 also stores or has access to the one or more FQDN access policies 109.

The one or more FQDN access policies 109 may use FQDN attributes that may include, but are not limited to, a host name, a subdomain name, or a domain name. For example, the FQDN access policy may allow users to access only a "gooddomainname.com" and no other domain. A wildcard may be used for one or more FQDN attributes. Since various subdomains of the "baddomain.com" may have different IP addresses, a deep packet inspection and decryption would be required, in conventional arrangements, to enforce this security rule (i.e., deep packet inspection and decryption would be needed in cases in which an FQDN access policy cannot be deployed).

FQDN access policies 109 may be created to provide for efficient traffic control in a number of different manners. For example, FQDN access policies 109 may allow bidirectional or unidirectional communication with a resource 112, allow only a certain type of traffic to reach the resource (e.g., allow HTTPS traffic only), allow file transfers (upload or download of contents with a particular format), identify a port that can be used (e.g., a port 80), block outgoing traffic or incoming traffic from the resource 112, etc.

As noted above, the environment 100 further includes the local domain name server 108 and the external domain name server 114. The local domain name server 108 is configured to locally resolve domain name queries (e.g., local domain name server 108 is a local physical or virtual server that uses LAN 104). The external domain name server 114 is configured to resolve any DNS query received via the WAN 110 (e.g., external domain name server 114 is an external physical or virtual server that uses WAN 110). The local domain name server 108 and the external domain name server 114 are provided by way of an example and for the sake of simplicity. One of ordinary skill in the art will readily appreciate that each of these servers may be any DNS system that includes one or more resolvers and a number of authoritative servers or a primary DNS server with a number of root servers.

The environment 100 further includes the endpoint service 116. The endpoint service 116 is an endpoint management/monitoring component that is configured to facilitate DNS resolution for the network security device 106. In an example embodiment, when the network security device 106 cannot resolve DNS information by examining its FQDN cache 107, the network security device 106 communicates with the endpoint service 116. The endpoint service 116 leverages the endpoint devices 102a-102n to obtain local resolution of an IP address to a domain name. That is, when one of the endpoint devices 102a-102n initiates a communication outbound for the network security device 106, the network security device 106 does not attempt to guess or resolve the DNS to a particular IP address independently of the respective endpoint device. Instead, the network security device 106 communicates with the endpoint service 116 (or the endpoint devices 102a-102n directly) to obtain the DNS resolution from one of the endpoint DNS caches 103a-n of the respective endpoint device that issues the request.

The endpoint service 116 may pre-populate the FQDN cache 107 based on previous host resolutions of the endpoint devices 102a-102n inquiries and may communicate with the endpoint devices 102a-102n using operating system (OS) queries. The endpoint service 116 may actively communicate with the endpoint devices 102a-102n to discover which particular IP address resolves to a domain name on the endpoint devices 102a-102n. By integrating with local mapping resolutions on the endpoint devices 102a-102n, the endpoint service 116 ensures that the network security device 106 opens the correct ports/traffic flows needed by the endpoint devices.

The endpoint service 116 may be a physical or virtual local server that communicates with the network security device 106 via LAN 104 and/or may be a physical or virtual external server that communicates with the network security device 106 via WAN 110. The number and distribution of the physical and/or virtual servers of the endpoint service 116 may vary depending on a particular deployment. In one example embodiment, the network security device 106 may use operating system (OS) queries such as OSquery or Structured Query Language (SQL) query, to communicate with the endpoint service 116.

Figure 2:
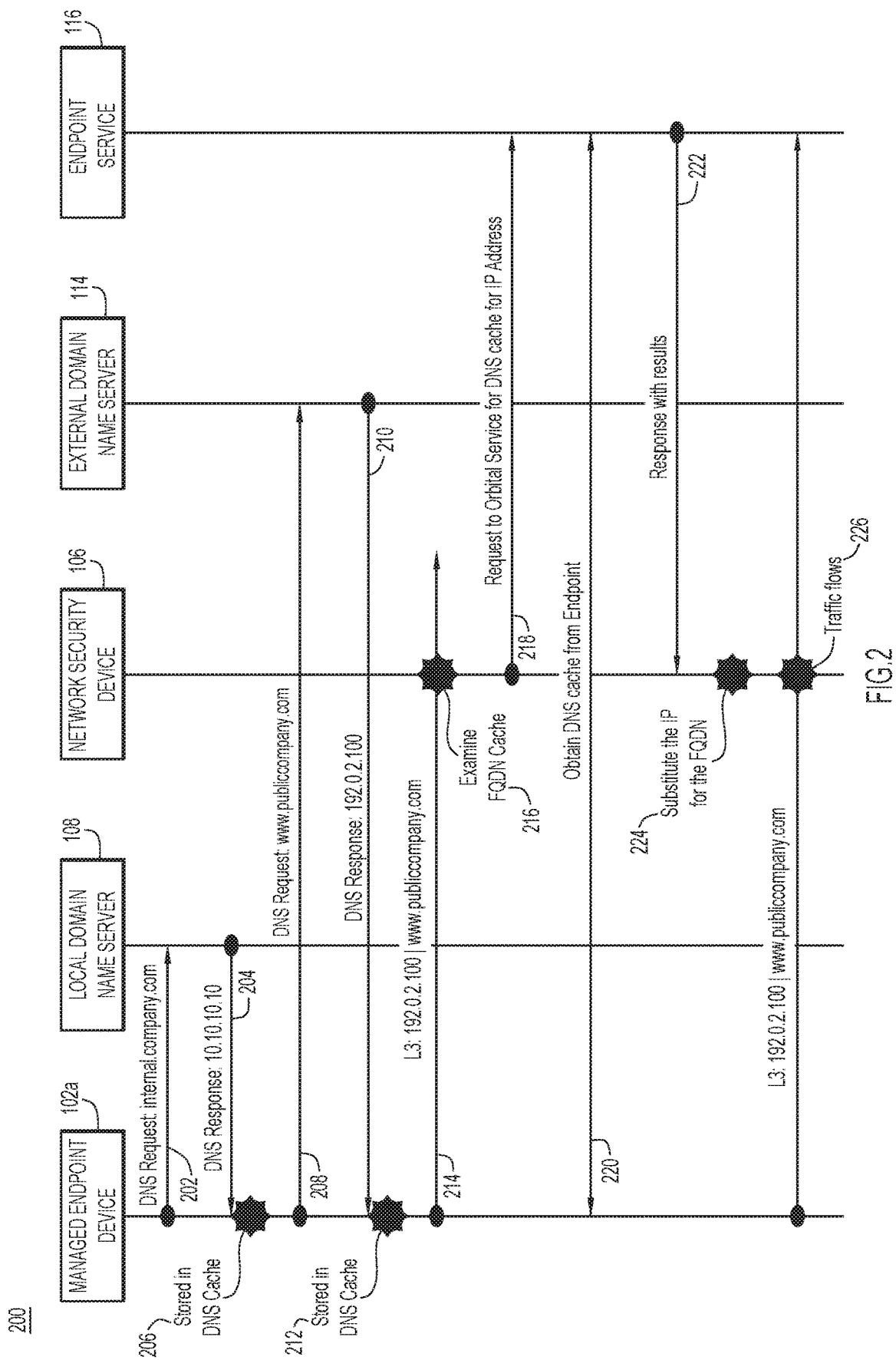
FIG. 2 is a flow diagram illustrating a method in which a network security device obtains DNS information associated with a managed endpoint device to permit traffic to flow to resources associated with at least one FQDN, according to an example embodiment.

FIG. 2 is a flow diagram illustrating an example flow 200 in which a network security device obtains DNS information associated with a managed endpoint device to permit traffic to flow to resources associated with at least one FQDN, according to an example embodiment. For ease of description, the example flow 200 of FIG. 2 is described with reference to elements described above with reference to FIG. 1, namely the managed endpoint device 102a, the network security device 106, the local domain name server 108, the external domain name server 114, and the endpoint service 116.

In the example of FIG. 2, the network security device 106 is assisted by the endpoint service 116 in enforcing the FQDN access policy and other access control solutions. As noted above, in one deployment, open source OS queries are used for communication between the endpoint service 116, the managed endpoint device 102a, and the network security device 106. In FIG. 2, it is assumed that the managed endpoint device 102a is a protected endpoint device that has a software security component installed therein. The software security component has a pre-established control plane connection that can be leveraged by the network security device 106.

When the managed endpoint device 102a attempts to establish a transit connection to the resource 112 (not shown in FIG. 2) through the network security device 106 with an FQDN access policy configured therein, the managed endpoint device 102a first resolves the domain name to an IP address. The managed endpoint device 102a obtains address/domain name resolutions from its endpoint DNS cache 103a. If a new domain name is encountered by the managed endpoint device 102a, the new domain name is resolved by communicating with an appropriate domain name server and is then stored in the endpoint DNS cache 103a. In the example of FIG. 2, the resolution of a domain name by the managed endpoint device 102a is depicted at 202-212.

Specifically, at 202, the managed endpoint device 102a sends a DNS request to the local domain name server 108 that provides domain name services. The request includes the domain name such as "internal.company.com." At 204, the local domain name server 108 responds with a corresponding IP address. That is, the DNS response includes a local IP address such as "10.10.10.10." At 206, the managed endpoint device 102a stores the mapping of "internal.company.com" to the IP address "10.10.10.10" in an internal DNS cache (the endpoint DNS cache 103a). By storing the mapping locally, the managed endpoint device 102a need not query the local domain name server 108 every single time it needs to send a packet to the domain name "internal.company.com". Next time, the managed endpoint device 102a may locally resolve the "internal.company.com" to the IP address "10.10.10.10" using the endpoint DNS cache 103a.

At 208, the managed endpoint device 102a sends another request to resolve a domain name "www.publiccompany.com" that is not available in the endpoint DNS cache 103a. Since this domain name is external, the DNS request is sent to the external domain name server 114 that also provides domain name services. At 210, the managed endpoint device 102a receives a DNS response from the external domain name server 114. The DNS response includes one of the IP addresses corresponding to the domain name "www.publiccompany.com". In this example, the DNS response includes "192.0.2.100." At 212, the managed endpoint device 102a stores the mapping in its local DNS cache (the endpoint DNS cache 103a).

According to an example embodiment of FIG. 2, both internal mappings and external mappings are stored in the endpoint DNS cache 103a. That is, it does not matter whether the mapping is local or external (private or public), the managed endpoint device 102a stores both mappings in the same cache, i.e. the endpoint DNS cache 103a. Further, the network security device 106 may need to open up ports for either or both of the connections. Once the domain name is resolved by the managed endpoint device 102a, the managed endpoint device 102a may use the IP address to communicate with the resource 112 (FIG. 1) such as a web site "internal.company.com" or a website "www.publiccompany.com."

At 214, the managed endpoint device 102a transmits a layer 3 (L3) packet to the IP address "192.0.2.100." The L3 network packet requires a Transmission Control Protocol (TCP) port to be open so that the L3 network packet can be communicated via the WAN 110 (FIG. 1) to the resource 112 (FIG. 1). If the network security device 106 has not encountered the IP address "192.0.2.100," the network security 106 will not have the port open (the TCP port) for this IP address. That is, to implement the FQDN access policies, the network security device 106 identifies the domain name that corresponds to this IP address.

As such, at 216, the network security device 106 examines its local FQDN cache i.e., the FQDN cache 107 (FIG. 1), to identify the domain name that corresponds to the IP address in the L3 packet received from the managed endpoint device 102a. If no mapping is found, the network security device 106 cannot substitute the IP address with a domain name; and thus, the network security device 106 cannot apply a security policy. In short, the port for this IP address is not yet open because the network security device 106 does not know which domain name the IP address maps to so as to enforce one or more of the FQDN policies.

Accordingly, at 218, the network security device 106 send a request to the endpoint service 116 (e.g., Cisco Orbital Advanced Search) for a domain name stored in a local cache (the endpoint DNS cache 103a) of the managed endpoint device 102a that corresponds to the IP address "192.0.2.100." The network security device 106 may provide an identifier of the managed endpoint device 102a using a source IP address extracted from the L3 packet, for example, and the IP address that needs to be resolved (a destination IP address). The destination IP address identifies the resource 112 and is also extracted from the L3 packet.

At 220, based on the information identifying the managed endpoint device 102a and the destination IP address, the endpoint service 116 sends a request to the managed endpoint device 102a to obtain information in the endpoint DNS cache 103a. At 220, the managed endpoint device 102a receives a response containing a corresponding domain name. In one example embodiment, the endpoint service 116 may request a particular mapping of the IP address and receive a domain name corresponding thereto. For example, the endpoint service 116 receives "www.publiccompany.com," retrieved from the endpoint DNS cache 103a of the managed endpoint device 102a. At 222, the endpoint service 116 forwards the response with the results to the network security device 106 e.g., the response includes the domain name "www.publiccompany.com."

In an alternative example embodiment, the endpoint service 116 may request the content of the endpoint DNS cache 103a of the managed endpoint device 102a and populate the FQDN cache of the network security device 106 with the received mappings. In other words, in one example embodiment, the network security device 106 may periodically request all contents of local DNS caches of endpoint devices 102a-102n attached thereto and pre-populate its FQDN cache with domain name mappings received from the endpoint service 116. The domain name mappings may include a time-to-live (TTL) value. Based on the TTL value as a predetermined criterion, the network security device 106 may determine whether to use a particular domain name mapping or request an update from the endpoint service 116. The domain name mappings may include other attributes that may be used as predetermined criteria for determining whether to use the domain name mapping, and the TTL value is just one example. As another example, other attributes may include an identifier of a particular endpoint device that provided the mapping. These attributes or various combinations of these attributes may be used as predetermined criteria for determining whether to use the particular domain name mapping or request an update from the endpoint service 116.

According to yet another example embodiment, the endpoint service 116 may periodically query the endpoint devices 102a-102n attached to the network security device 106 and provide updates to the FQDN cache. The frequency of the queries may be based on predetermined time intervals that are pre-configured by an administrator or set by a user. According to yet another example embodiment, a combination of these various techniques may be deployed based on pre-configured rules.

Returning to the specific example of FIG. 2, at 224, the network security device 106 substitutes the IP address with the FQDN and obtains one or more FQDN policies that apply. Additionally, the network security device 106 stores the mapping resolution in its FQDN cache for future use. At 226, the network security device 106 opens the port 80 and allows the traffic to flow to the resource 112 (www.publiccompany.com) based on the FQDN policies that apply to the domain name "www.publiccompany.com."

In various example embodiments, if an FQDN access policy is configured, the network security device 106 checks the destination IP addresses of a connection against its FQDN cache for this particular managed endpoint device 102a. Additionally, in case of connections originating from the particular managed endpoint device 102a, the network security device 106 may check the source IP address field against caches of the other endpoints 120b-102n or even the endpoint service 116. If a match is found and the entry is valid, the respective source IP address or the respective destination IP address is substituted for the cached FQDN. The FQDN is then matched against the configured policy.

However, if no match is found or if the entry is invalid, the network security device 106 sends a request to the endpoint service 116 with respect to the source host to query the endpoint DNS cache 103a of the endpoint device 102a for the destination IP in question. In one example embodiment, the network security device 106 can also optionally query a DNS cache of the destination host (the resource 112) for the source IP address. If a match is found, by the endpoint service 116 in the endpoint DNS cache 103a of the managed endpoint device 102a, then the respective source or destination IP address is substituted for the cached FQDN. The FQDN is then matched against the configured policy.

To speed up enforcement, the endpoint service 116 may pre-populate the FQDN cache of the network security device 106 with most commonly used entries (such as *.clients.domainname.com). Further, the endpoint service 116 may also populate the FQDN cache with an entry immediately upon a host (one of the endpoint devices 102a-102n) completing a DNS resolution. The cache lookup behavior may also be turned on globally so that traffic from the endpoint devices 102a-102n (with or without the endpoint service 116) can be matched to the FQDN access policy. The network security device 106 or the endpoint service 116 may match an FQDN entry to a particular IP address if enough (based on a configured threshold) monitored endpoints devices from among the endpoint devices 102a-102n return the same value. The FQDN cache of the network security device 106 could be used initially, and then compared to the query results of the endpoint DNS caches 103a-n and updated retrospectively, if necessary. In one form, the endpoint service 116 may be embedded within the network security device 106 itself. In this case, the network security device 106 directly communicates with the endpoint devices 102a-102n.

According to one example embodiment, the FQDN cache may include a table that stores the domain name, corresponding one or more IP addresses, and one or more identifiers of the sources (identifier of one of the endpoint devices 102a-102n which provided the mapping). According to various example embodiment, the endpoint service 116 allows the network security device 106 to access the endpoint DNS caches 103a-n to facilitate endpoint-specific IP to FQDN remapping and FQDN access policy enforcement.

As noted, example embodiments discussed above provide the endpoint service 116 as a separate component. Other example embodiments contemplate that the endpoint service 116 may be internal to the local network of the endpoint devices 102a-102n or that the endpoint service 116 maybe integrated into the network security device 106 so that the network security device 106 communicates directly with the endpoint devices 102a-102n to obtain information from their local caches.

Figure 3:
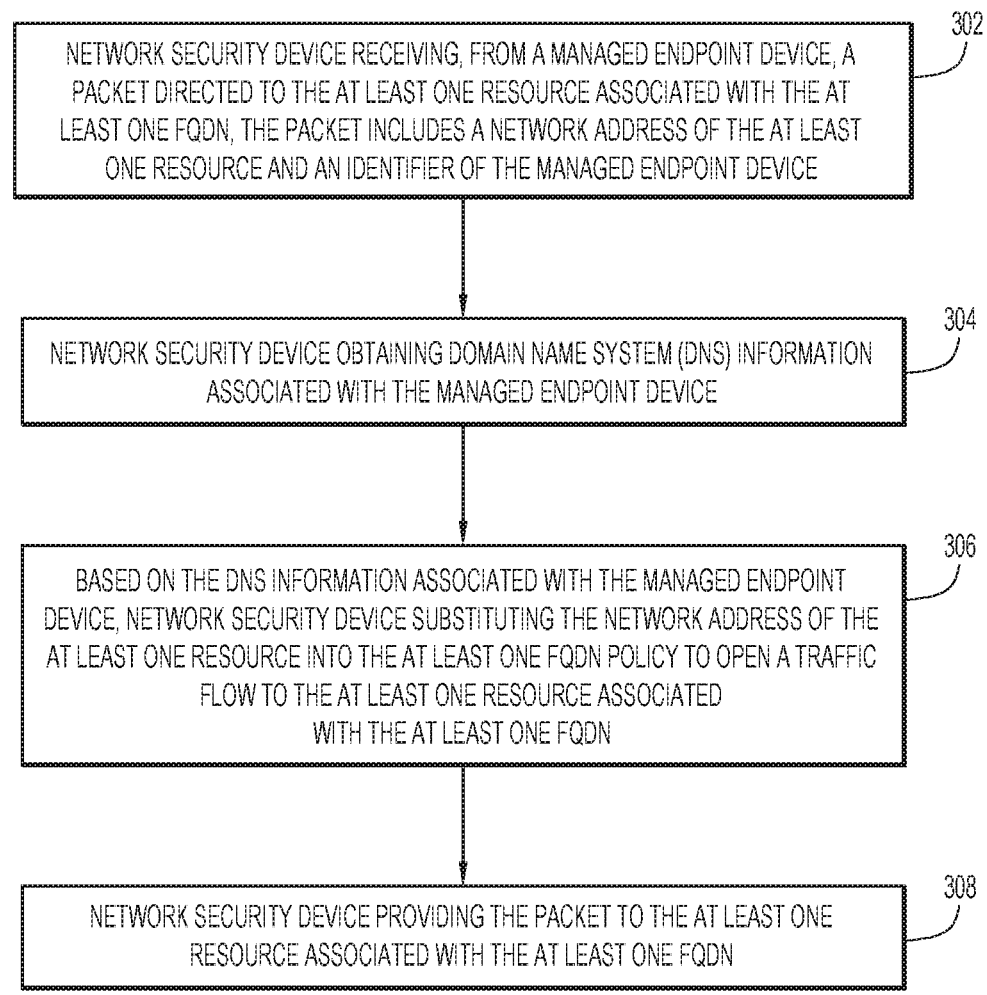
FIG. 3 is a flowchart generally depicting a method of permitting traffic to flow to resources associated with at least one FQDN, according to an example embodiment.

Turning now to FIG. 3, a flowchart is now described for a method 300 of permitting traffic to flow to resources associated with at least one FQDN, according to an example embodiment. The method 300 may be performed by a network security device such as the network security device 106 shown in FIGS. 1 and 2. The network security device has at least one Fully Qualified Domain Name (FQDN) access policy that permits traffic to flow to at least one resource associated with at least one FQDN.

At 302, the network security device receives, from a managed endpoint device, a packet directed to the at least one resource associated with the at least one FQDN. The packet includes a network address of the at least one resource and an identifier of the managed endpoint device. At 304, the network security device obtains Domain Name System (DNS) information associated with the managed endpoint device. At 306, based on the DNS information associated with the managed endpoint device, the network security device substitutes the network address of the at least one resource into the at least one FQDN access policy to open a traffic flow to the at least one resource associated with the at least one FQDN. At 308, the network security device provides the packet to the at least one resource associated with the at least one FQDN.

In the method 300, the operation 304 of obtaining the DNS information associated with the managed endpoint may include sending a resolution request to an endpoint service. The resolution request is configured to cause the endpoint service to query the managed endpoint device for the DNS information associated with the managed endpoint device. The operation 304 may further include following a query by the endpoint service to the managed endpoint device, receiving the DNS information associated with the managed endpoint device from the endpoint service.

In one form, the operation of sending the resolution request may include sending the resolution request to the endpoint service before receiving the packet from the managed endpoint device. In another form, the operation of sending the resolution request may further include, based on receiving the packet directed to the at least one resource associated with the at least one FQDN, extracting from the packet the network address of the at least one resource associated with the at least one FQDN and the identifier of the managed endpoint device, generating the resolution request to include the network address and the identifier of the managed endpoint device, and sending the resolution request to the endpoint service.

The operation 304 of obtaining the DNS information associated with the managed endpoint device may further include sending a DNS information query directly to the managed endpoint device.

The method 300 may further include searching a local FQDN cache of the network security device for a mapping of the network address of the at least one resource to the at least one FQDN access policy, determining that the network address of the at least one resource is not currently mapped to the at least one FQDN access policy, and obtaining the DNS information associated with the managed endpoint device directly from the managed endpoint device or indirectly via an endpoint service in response to determining that the network address of the at least one resource is not currently mapped to the at least one FQDN access policy.

In the method 300, the DNS information associated with the managed endpoint device may include one or more mappings of network addresses to FQDNs. The method 300 may further include the network security device storing the one or more mappings of network addresses to FQDNs in a local FQDN cache of the network security device.

The operation 304 of obtaining the DNS information associated with the managed endpoint device may further include obtaining the one or more mappings that meet at least a predetermined criterion that includes at least one of a time-to-live value or a time stamp.

The operation 304 of obtaining the DNS information associated with the managed endpoint device may further include based on an expiration of a predetermined time interval, obtaining, directly from the managed endpoint device or indirectly via an endpoint service, the one or more mappings that meet at least a predetermined criterion and are stored in a local domain name cache of the managed endpoint device. The predetermined criterion includes at least one of a time-to-live value or a time stamp.

The method 300 may further include obtaining, from a domain name cache of the at least one resource associated with the at least one FQDN, the identifier of the managed endpoint device. The identifier of the managed endpoint device is an Internet Protocol (IP) address of the managed endpoint device.

In the method 300, the identifier of the managed endpoint device may be an Internet Protocol (IP) address of the managed endpoint device and the at least one resource associated with the at least one FQDN may include a first local resource and a second external resource.

Figure 4:
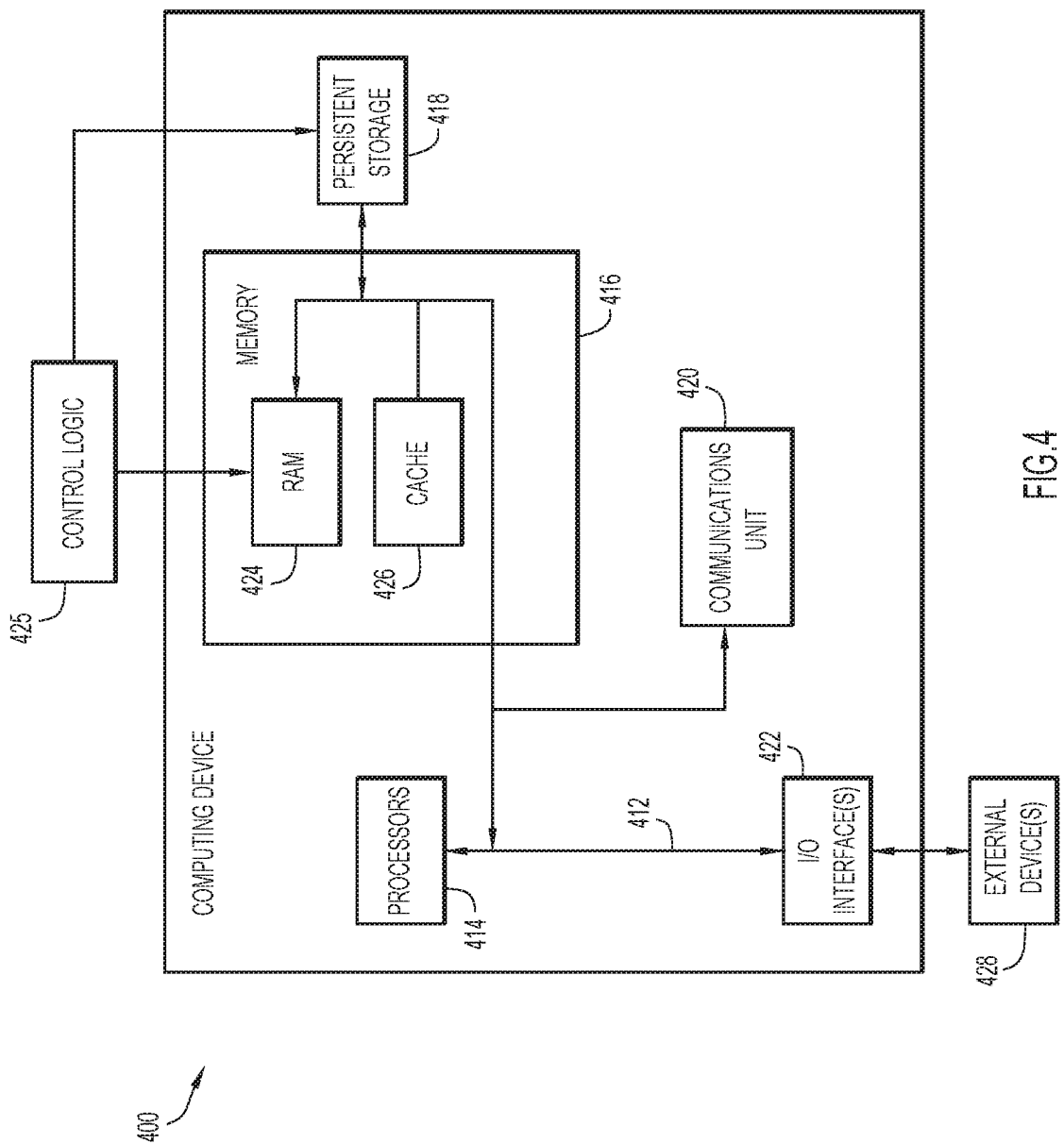
FIG. 4 is a hardware block diagram of a network security device configured to perform the techniques for permitting traffic to flow to resources associated with at least one FQDN, according to various example embodiments.

FIG. 4 is a hardware block diagram illustrating a computing device 400 that may perform the functions of a network security device referred to herein in connection with FIGS. 1-3, according to example embodiments.

It should be appreciated that FIG. 4 provides only an illustration of one embodiment and does not imply any limitations with regard to the environments in which different embodiments may be implemented. Many modifications to the depicted environment may be made.

As depicted, the computing device 400 includes a bus 412, which provides communications between computer processor(s) 414, memory 416, persistent storage 418, communications unit 420, and input/output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media. In the depicted embodiment, memory 416 includes random access memory (RAM) 424 and cache memory 426. In general, memory 416 can include any suitable volatile or non-volatile computer readable storage media. Instructions for the control logic 425 may be stored in memory 416 or persistent storage 418 for execution by processor(s) 414.

The control logic 425 includes instructions that, when executed by the computer processor(s) 414, cause the computing device 400 to perform one or more of the methods described herein for implementation of an FQDN access policy and obtaining DNS information (e.g., the operations described above with reference to any of FIG. 1, 2, or 3). The control logic 425 may be stored in the memory 416 or the persistent storage 418 for execution by the computer processor(s) 414.

One or more programs may be stored in persistent storage 418 for execution by one or more of the respective computer processors 414 via one or more memories of memory 416. The persistent storage 418 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422 allows for input and output of data with other devices that may be connected to computing device 400. For example, I/O interface 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

Software and data used to practice embodiments can be stored on such portable computer readable storage media and can be loaded onto persistent storage 418 via I/O interface(s) 422.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

In still another example embodiment, an apparatus is a network security device. The apparatus includes a communication interface, a memory configured to store executable instructions, and a processor coupled to the communication interface and the memory. The processor is configured to perform operations that include receiving, from a managed endpoint device, a packet directed to at least one resource associated with the at least one Fully Qualified Domain Name (FQDN), where the apparatus has at least one FQDN access policy that permits traffic to flow to the at least one resource associated with the at least one FQDN and the packet includes a network address of the at least one resource and an identifier of the managed endpoint device and obtaining Domain Name System (DNS) information associated with the managed endpoint device. The apparatus is further configured to perform the operations of, based on the DNS information associated with the managed endpoint device, substituting the network address of the at least one resource into the at least one FQDN access policy to open a traffic flow to the at least one resource associated with the at least one FQDN and providing the packet to the at least one resource associated with the at least one FQDN.

In one form, the processor may further be configured to perform the operation of obtaining the DNS information associated with the managed endpoint device by sending a resolution request to an endpoint service, the resolution request being configured to cause the endpoint service to query the managed endpoint device for the DNS information associated with the managed endpoint device and by, following a query by the endpoint service to the managed endpoint device, receiving the DNS information associated with the managed endpoint device from the endpoint service.

According to one or more example embodiments, the processor may further be configured to perform the operations including sending the resolution request to the endpoint service before receiving the packet from the managed endpoint device.

In yet another form, the processor may further be configured to perform the operation of obtaining the DNS information associated with the managed endpoint device by sending a DNS information query directly to the managed endpoint device.

According to one or more example embodiments, the processor is further configured to perform the operations including searching a local FQDN cache of the apparatus for a mapping of the network address of the at least one resource to the at least one FQDN access policy, determining that the network address of the at least one resource is not currently mapped to the at least one FQDN access policy, and obtaining the DNS information associated with the managed endpoint device directly from the managed endpoint device or indirectly via an endpoint service in response to determining that the network address of the at least one resource is not currently mapped to the at least one FQDN access policy.

According to one or more example embodiments, the DNS information associated with the managed endpoint device includes one or more mappings of network addresses to FQDNs and the processor may further be configured to perform the operations including storing the one or more mappings of network addresses to FQDNs in a local FQDN cache.

The processor may further be configured to perform the operation of obtaining the DNS information associated with the managed endpoint device by obtaining the one or more mappings that meet a predetermined criterion that includes at least one of a time-to-live value or a time stamp.

In yet another example embodiment, one or more non-transitory computer readable storage media encoded with instructions are provided. When the media is executed by the processor, the instructions cause the processor to perform operations including receiving, from a managed endpoint device, a packet directed to at least one resource associated with the at least one Fully Qualified Domain Name (FQDN), where at least one FQDN access policy is provided that permits traffic to flow to the at least one resource associated with the at least one FQDN and the packet includes a network address of the at least one resource and an identifier of the managed endpoint device. The operations further include obtaining Domain Name System (DNS) information associated with the managed endpoint device, based on the DNS information associated with the managed endpoint device, substituting the network address of the at least one resource into the at least one FQDN access policy to open a traffic flow to the at least one resource associated with the at least one FQDN, and providing the packet to the at least one resource associated with the at least one FQDN.

In one form, the instructions may further cause the processor to perform the operation of obtaining the DNS information associated with the managed endpoint device by sending a resolution request to an endpoint service, where the resolution request is configured to cause the endpoint service to query the managed endpoint device for the DNS information associated with the managed endpoint device and by, following a query by the endpoint service to the managed endpoint device, receiving the DNS information associated with the managed endpoint device from the endpoint service.

The embodiments presented may be in other various other forms, such as a system or a computer program product. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a network security device having at least one Fully Qualified Domain Name (FQDN) access policy that specifies whether to permit or block traffic to flow to at least one resource associated with at least one FQDN and having an FQDN cache populated with a plurality of local domain name mappings obtained from a plurality of endpoint DNS local caches of a plurality of endpoint devices, the plurality of endpoint devices are connected to the network security device via a local access network:

receiving, from a managed endpoint device, a packet directed to the at least one resource associated with the at least one FQDN, wherein the packet includes a network address of the at least one resource and an identifier of the managed endpoint device;

obtaining Domain Name System (DNS) information associated with the managed endpoint device by:
  obtaining a domain name mapping in the FQDN cache, and
  in response to determining that the domain name mapping does not meet a predetermined criterion or is not found in the FQDN cache:
    sending a resolution request to an endpoint service which integrates with the plurality of endpoint devices for local mapping resolutions using the plurality of endpoint DNS local caches, wherein the resolution request is configured to cause the endpoint service to query the managed endpoint device for the DNS information associated with the managed endpoint device and following a query by the endpoint service to the managed endpoint device, and
    receiving the DNS information associated with the managed endpoint device from the endpoint service;

based on the DNS information associated with the managed endpoint device, substituting the network address of the at least one resource into the at least one FQDN access policy to open a traffic flow to the at least one resource associated with the at least one FQDN; and providing the packet to the at least one resource associated with the at least one FQDN.

2. The method of claim 1, wherein sending the resolution request includes:
sending the resolution request to the endpoint service before receiving the packet from the managed endpoint device to populate the FQDN cache with the plurality of local domain name mappings.

3. The method of claim 1, wherein sending the resolution request includes:
based on receiving the packet directed to the at least one resource associated with the at least one FQDN, extracting from the packet the network address of the at least one resource associated with the at least one FQDN and the identifier of the managed endpoint device, generating the resolution request to include the network address and the identifier of the managed endpoint device, and sending the resolution request to the endpoint service.

4. The method of claim 1, further comprising:
searching the FQDN cache of the network security device for a mapping of the network address of the at least one resource to the at least one FQDN access policy;
determining that the network address of the at least one resource is not currently mapped to the at least one FQDN access policy; and
obtaining the DNS information associated with the managed endpoint device in response to determining that the network address of the at least one resource is not currently mapped to the at least one FQDN access policy.

5. The method of claim 1, wherein the DNS information associated with the managed endpoint device includes one or more mappings of network addresses to FQDNs, and wherein the method further comprises:
storing the one or more mappings of the network addresses to the FQDNs in a local FQDN cache of the network security device.

6. The method of claim 5, wherein obtaining the DNS information associated with the managed endpoint device includes:
obtaining the one or more mappings that meet the predetermined criterion that includes at least one of a time-to-live value or a time stamp.

7. The method of claim 5, further comprising:
based on an expiration of a predetermined time interval, obtaining, directly from the managed endpoint device or indirectly via the endpoint service, the one or more mappings that meet the predetermined criterion and are stored in a local domain name cache of the managed endpoint device, the predetermined criterion includes at least one of a time-to-live value or a time stamp.

8. The method of claim 1, further comprising:
obtaining, from a domain name cache of the at least one resource associated with the at least one FQDN, the identifier of the managed endpoint device, wherein the identifier of the managed endpoint device is an Internet Protocol (IP) address of the managed endpoint device.

9. The method of claim 1, wherein the identifier of the managed endpoint device is an Internet Protocol (IP) address of the managed endpoint device and wherein the at least one resource associated with the at least one FQDN includes a first local resource and a second external resource.

10. The method of claim 1, further comprising:
periodically requesting, by the network security device, contents of the plurality of endpoint DNS local caches of the plurality of endpoint devices that are attached to the network security device, wherein the contents include the plurality of local domain name mappings; and
updating the FQDN cache based on the contents from the plurality of endpoint devices.

11. The method of claim 1, wherein the endpoint service obtains the domain name mapping from a cache of the managed endpoint device that resolved a domain name by communicating with a local domain name server or an external domain name server.

12. An apparatus comprising:
a communication interface;
a memory configured to store executable instructions for at least one Fully Qualified Domain Name (FQDN) access policy that specifies whether to permit or block traffic to flow to at least one resource associated with at least one FQDN and having an FQDN cache populated with a plurality of local domain name mappings obtained from a plurality of endpoint DNS local caches of a plurality of endpoint devices, the plurality of endpoint devices are connected to the apparatus via a local access network; and
a processor coupled to the communication interface and the memory and configured to perform operations including:
receiving, from a managed endpoint device, a packet directed to the at least one resource associated with the at least one FQDN, wherein the packet includes a network address of the at least one resource and an identifier of the managed endpoint device;

obtaining Domain Name System (DNS) information associated with the managed endpoint device by:

obtaining a domain name mapping in the FQDN cache, and in response to determining that the domain name mapping does not meet a predetermined criterion or is not found in the FQDN cache:

sending a resolution request to an endpoint service which integrates with the plurality of endpoint devices for local mapping resolutions using the plurality of endpoint DNS local caches, wherein the resolution request is configured to cause the endpoint service to query the managed endpoint device for the DNS information associated with the managed endpoint device and following a query by the endpoint service to the managed endpoint device, and receiving the DNS information associated with the managed endpoint device from the endpoint service;

based on the DNS information associated with the managed endpoint device, substituting the network address of the at least one resource into the at least one FQDN access policy to open a traffic flow to the at least one resource associated with the at least one FQDN; and providing the packet to the at least one resource associated with the at least one FQDN.

13. The apparatus of claim 12, wherein the processor is further configured to perform the operations including:

sending the resolution request to the endpoint service before receiving the packet from the managed endpoint device.

14. The apparatus of claim 12, wherein the processor is further configured to perform the operations including:

searching a local FQDN cache of the apparatus for a mapping of the network address of the at least one resource to the at least one FQDN access policy;

determining that the network address of the at least one resource is not currently mapped to the at least one FQDN access policy; and obtaining the DNS information associated with the managed endpoint device in response to determining that the network address of the at least one resource is not currently mapped to the at least one FQDN access policy.

15. The apparatus of claim 12, wherein the processor is further configured to perform:

obtaining, from a domain name cache of the at least one resource associated with the at least one FQDN, the identifier of the managed endpoint device, wherein the identifier of the managed endpoint device is an Internet Protocol (IP) address of the managed endpoint device.

16. The apparatus of claim 12, wherein the identifier of the managed endpoint device is an Internet Protocol (IP) address of the managed endpoint device and the at least one resource associated with the at least one FQDN includes a first local resource and a second external resource.

17. One or more non-transitory computer readable storage media encoded with instructions that, when executed by a processor, cause the processor to perform operations including:

receiving, from a managed endpoint device, a packet directed to at least one resource associated with at least one Fully Qualified Domain Name (FQDN), wherein at least one FQDN access policy is provided that specifies whether to permit or block traffic to flow to the at least one resource associated with the at least one FQDN, wherein an FQDN cache is populated with a plurality of local domain name mappings obtained from a plurality of endpoint DNS local caches of a plurality of endpoint devices, wherein the plurality of endpoint devices are connected to the processor via a local access network, and wherein the packet includes a network address of the at least one resource and an identifier of the managed endpoint device;

obtaining Domain Name System (DNS) information associated with the managed endpoint device by:

obtaining a domain name mapping in the FQDN cache, and in response to determining that the domain name mapping does not meet a predetermined criterion or is not found in the FQDN cache:

sending a resolution request to an endpoint service which integrates with the plurality of endpoint devices for local mapping resolutions using the plurality of endpoint DNS local caches, wherein the resolution request is configured to cause the endpoint service to query the managed endpoint device for the DNS information associated with the managed endpoint device and following a query by the endpoint service to the managed endpoint device, and receiving the DNS information associated with the managed endpoint device from the endpoint service;

based on the DNS information associated with the managed endpoint device, substituting the network address of the at least one resource into the at least one FQDN access policy to open a traffic flow to the at least one resource associated with the at least one FQDN; and providing the packet to the at least one resource associated with the at least one FQDN.

18. The one or more non-transitory computer readable storage media according to claim 17, wherein the instructions cause the processor to perform:

sending the resolution request to the endpoint service before receiving the packet from the managed endpoint device.

19. The one or more non-transitory computer readable storage media according to claim 17, wherein the instructions cause the processor to perform:

obtaining, from a domain name cache of the at least one resource associated with the at least one FQDN, the identifier of the managed endpoint device, wherein the identifier of the managed endpoint device is an Internet Protocol (IP) address of the managed endpoint device.

20. The one or more non-transitory computer readable storage media according to claim 17, wherein the identifier of the managed endpoint device is an Internet Protocol (IP) address of the managed endpoint device and the at least one resource associated with the at least one FQDN includes a first local resource and a second external resource.

* * * * *